Patented June 26, 1951

2,558,561

UNITED STATES PATENT OFFICE 2,558,561

ELASTIC ORGANOPOLYSILOXANES PREPARED WITH THE AID OF A BORON HYDRIDE

Moyer M. Safford and Dallas T. Hurd, Schenectady, N. Y., assignors to General Electric Company, a corporation of New York No Drawing. Application September 12, 1950, Serial No. 184,529

23 Claims. (Cl. 260—46.5)

This invention is concerned with heat-convertible elastic compositions of matter and methods of preparing the same. More particularly, the invention relates to a heat-convertible composition of matter comprising (1) a viscous liquid heat-curable organopolysiloxane or a solid, elastic heat-curable polymerized organopolysiloxane containing an average from about 1.75 to 2.25 organic groups, for example, hydrocarbon groups, per silicon atom, said organic groups being attached to the silicon atoms through carbon-silicon linkages, and (2) a cure accelerator for (1) comprising a boron hydride.

Elastomeric compositions of matter comprising heat-converted, elastic hydrocarbon-substituted polysiloxanes commonly known as "silicone rubbers" have found extensive use in applications requiring resistance to elevated temperatures for extended periods of time. Such compositions of matter and methods of preparing the same are more specifically described, for example, in Wright et al. Patent 2,448,565 and Agens Patent 2,448,756, both issued September 7, 1948, and in Krieble et al. Patent 2,457,688, issued December 28, 1948, all the foregoing applications being assigned to the same assignee as the present invention, in Hyde Patent 2,490,357, issued December 6, 1949, in Warrick Patent 2,480,620, issued August 30, 1949, and in Warrick Patent 2,494,920, issued January 17, 1950.

In the aforementioned Wright et al. patent there is disclosed and claimed the use of benzoyl peroxide as a catalyst for converting heat-curable (or vulcanizable) organo-substituted polysiloxanes, for example, hydrocarbon-substituted polysiloxanes, more particularly, a methyl-substituted polysiloxane containing an average of from about 1.98 to 2.0 methyl groups per silicon atom, to a cured elastomeric product. Although benzoyl peroxide is satisfactory in many respects as a cure accelerator, and is also one of the few catalysts which will effect vulcanization of silicone gum, nevertheless benzoyl peroxide has the undesirable property of effecting slight decomposition of the silicone rubber after extended periods of time at elevated temperatures. This is evidenced by the fact that increased amounts of volatile matter are obtained from the cured silicone rubber after heating for long periods of time at temperatures of the order of about 220° C.

We have now discovered that another class of cure accelerators or vulcanizing agents in addition to benzoyl peroxide can be employed to give heat-cured compositions of matter having at least the same properties as those obtained by using benzoyl peroxide as a cure accelerator for the synthetic elastic products described above. In addition, we have also found that this new class of cure accelerators has the added advantage that after long periods of time at elevated temperatures, there is less tendency of the solid, elastic organopolysiloxane to decompose or to evolve volatile matter.

In accordance with our invention, a liquid, heat-curable organopolysiloxane which is sufficiently viscous to handle in molding operations or a solid, elastic, heat-curable organopolysiloxane, preferably containing an average of from about 1.75 to 2.25 organic groups per silicon atom, is mixed thoroughly with a boron hydride and this mixture is subjected to heat and, preferably, pressure to effect conversion of the organopolysiloxane to the insoluble, infusible state. The cure accelerator which we have found to be particularly advantageous in this respect comprises the class of boron hydrides which, for purposes of brevity, will be referred to hereinafter in the specification and in the claims as a "boron hydride" and will denote compounds of boron containing boron and hydrogen atoms as, for example, pure boron hydrides, e. g., liquid and solid boron hydrides, complex addition products or derivatives of boron hydrides, organic derivatives of boron hydrides as, for example, diphenyl decaborane, etc., and mixtures thereof.

The liquid or solid, elastic, curable organopolysiloxanes employed in the practice of our invention are well known and are adequately described in the art. Directions for obtaining these materials may be found in the patents referred to above, which also contain various methods by which the heat-curable liquid and solid elastic products may be obtained from the various liquid organo-substituted, particularly hydrocarbon-substituted, polysiloxanes. In application Serial No. 184,528, filed concurrently herewith in the name of Moyer M. Safford, and assigned to the same assignee as the present invention, are disclosed methods for preparing some of the soluble and fusible organopolysiloxane gums which may be employed in our invention.

In the preferred embodiments of our invention, the liquid or solid, elastic, curable (that is, heat-convertible) polymerized hydrocarbon-substituted polysiloxane is one in which the average ratio of hydrocarbon groups to silicon atoms ranges from about 1.95 to 2.25 hydrocarbon groups per silicon atom, and where at least 90% of the silicon atoms have two hydrocarbon groups attached thereto, the remaining 10% or less of the silicon atoms having from 1 to 3 hydrocarbon radicals attached to the silicon atoms, so that the overall proportion of hydrocarbon radicals to silicon atoms in the entire hydrocarbon-substituted polysiloxane is within the range of 1.95 to 2.25. Preferably, the solid, elastic, curable organo-substituted polysiloxane (e. g., hydrocarbon-substituted polysiloxane) contains an average from about 1.98 to 2.0 hydrocarbon (e. g., methyl) radicals per silicon atom. These liquid or elastic hydrocarbon-substituted polysiloxanes may be obtained by condensing a liquid polymeric diorgano-substituted, e. g., a dihydrocarbon-substituted, polysiloxane (e. g., polymeric dimethylsiloxane) in the pure state or containing, for example, small percents, for instance, up to two or more percent copolymerized monohydrocarbon-substituted siloxane (e. g., monomethylsiloxane) as is disclosed more fully in the previously mentioned patents of Agens, Wright et al., etc. The starting organopolysiloxane may contain higher or lower percents of copolymerized mono-organosiloxanes or tri-organosiloxanes consistent with the ratio of organic groups per silicon atom to come within the ratios described previously.

In order to prepare the claimed synthetic rubbers from the elastic product, the latter may be worked on ordinary rubber compounding or differential rolls until it attains the desired consistency. The boron hydride and, if desired, a filler may be added during this operation. After being formed into the desired shape and molded under the influence of heat (e. g., at elevated temperatures of the order of from 100° to 300° C. for from 5 to 60 minutes or more) and pressure, the synthetic elastomer may be further cured or heat treated in an oven (e. g., at 150° to 300° C.) until the desired degree of cure is obtained.

Among the boron hydrides which may be employed in the practice of the invention may be mentioned, for example, decaborane ($B_{10}H_{14}$), pentaborane ($B_5H_9$), hexaborane ($B_6H_9$), etc.; complexes of the boron hydrides as, for example, the ammonia complex of diborane having the formula $B_2H_5.2NH_3$, etc.; complexes of decaborane with hexamethylenetetramine or with p,p'-diaminodiphenylmethane, etc.; organic derivates of boron hydrides as, for instance, diphenyl decaborane, etc. It will of course be apparent to those skilled in the art that other boron hydrides of similar nature or mixtures of such boron hydrides may be employed without departing from the scope of the invention.

The amount of boron hydride which can be used to effect vulcanization or cure of the organopolysiloxanes to a substantially infusible and insoluble state may be varied within wide limits without departing from the scope of the invention. Based on the weight of the heat-curable organopolysiloxane, for instance, the polymeric methyl polysiloxane, we may use from about 0.1 to as high as 5%, by weight, or more of the boron hydride. Preferably the amount of the boron hydride is from about 0.25 to 3%, by weight, based on the weight of the organopolysiloxane. Although larger quantities may be employed, the amount of boron hydride employed as the curing agent ordinarily should not exceed about 6 percent, particularly where the finally cured product will be continuously subjected to elevated temperatures.

Among the fillers which may be employed in the practice of this invention may be mentioned inorganic fillers, for example, lithopone, ferric oxide, titanium dioxide, talc, zinc oxide, etc. The aforementioned fillers may be incorporated in the elastic product (viscous liquid organopolysiloxanes may also be used) in amounts ranging from about 0.1 to 3 parts, by weight, preferably from about 0.25 to 2.50 parts, by weight, filler per part organopolysiloxane.

In order that those skilled in the art may better understand how the present invention may be practiced, the following examples are given by way of illustration rather than by way of limitation. All parts are by weight.

*Example 1*

A solid, elastic, rubbery, polymeric dimethylsiloxane was prepared by hydrolyzing substantially pure dimethyldichlorosilane and thereafter condensing the liquid, oily, non-resinous methyl polysiloxane with ferric chloride hexahydrate in the same manner as disclosed in the aforementioned Agens application. About 100 parts of the elastic product obtained above was milled on differential rubber rolls for about one-half hour with 200 parts titanium dioxide, and 0.5 part $B_{10}H_{14}$ until a homogeneous sheet was obtained. The rolled sheet was molded between heated platens for about 20 minutes at 150° C. at a pressure of 500 p. s. i. and thereafter aged in an air circulating oven at 200° C. As a control a similar silicone rubber sheet was prepared with the exception that, instead of using 0.5 part $B_{10}H_{14}$, 0.5 part benzoyl peroxide was used in its place. The following table shows the results of tensile strength tests of the two cured samples after heating (i. e., heat-aging) at 150° C. for varying lengths of time.

TABLE I

| Cure Accelerator | Time of Cure at 150° C. | Tensile |
|---|---|---|
|  | *Minutes* | *P. s. i.* |
| Benzoyl Peroxide | 2 | 80 |
|  | 4 | 118 |
|  | 8 | 93 |
|  | 16 | 68 |
| $B_{10}H_{14}$ | 2 | 263 |
|  | 4 | 338 |
|  | 8 | 317 |
|  | 16 | 286 |

The above Table I illustrates that the boron hydride under equivalent conditions, gives a greater tensile strength in a shorter period of time than is obtainable with the benzoyl peroxide in an equivalent concentration.

*Example 2*

We have found that the presence of small amounts of a boron hydride improves the heat aging properties of silicone elastomers. In the following examples, the same polymeric dimethylsi'oxane employed in Example 1 was mixed with varying percentages by weight thereof of $B_{10}H_{14}$ and the modified gums were heated for 300 hours at 300° C. As a control, the same gum without the $B_{10}H_{14}$ was heated at 300° C. Additional samples were also made up in which varying amounts of benzoyl peroxide were incorporated.

The following Table II shows the results of such heat aging for the stipulated number of hours at 300° C.

TABLE II

| Cure Accelerator | Percent by Weight | Hours at 300° C. | Percent Weight Loss |
|---|---|---|---|
| None | 0 | 24 | ¹20 |
|  | 0 | 120 | ¹57 |
| Benzoyl Peroxide | 0.05 | 24 | ¹12 |
|  | 0.05 | 120 | ¹41 |
|  | 0.10 | 24 | ¹12 |
|  | 0.10 | 120 | ¹42 |
|  | 0.50 | 24 | ¹12 |
|  | 0.50 | 120 | ¹46 |
|  | 1.00 | 72 | ¹36 |
|  | 1.00 | 120 | ¹52 |
| $B_{10}H_{14}$ | 0.05 | 24 | 7 |
|  | 0.05 | 120 | 19 |
|  | 0.05 | 220 | 25 |
|  | 0.10 | 24 | 9 |
|  | 0.10 | 220 | 31 |
|  | 0.50 | 24 | 13 |
|  | 0.50 | 220 | 37 |

¹ Disintegrated.

From the foregoing Table II it is clearly apparent that the presence of small amounts of a boron hydride, specifically $B_{10}H_{14}$ in this case, imparts improved heat stability as well as a reduction in weight loss when the silicone elastic product is heated at elevated temperatures even after long periods of time. In contrast to this, comprised the addition compound of the two ingredients.

The isolated addition product was a grayish white solid which did not melt but began to decompose and turn brown at 250° C. It was insoluble in benzene, water, and acetone.

Another addition compound of decaborane and p,p'-diaminodiphenylmethane was prepared by dissolving 0.5 gram p,p'-diaminodiphenylmethane in an excess of benzene and adding 0.1 gram decaborane. The addition compound was isolated in the form of a tan colored crystalline solid which did not melt but began to darken at 325° C. It was insoluble in benzene and water but reacted with acetone to give off gas and heat.

Each of the above prepared addition products was used as a vulcanization accelerator for a silicone elastomer in which the basic formulation comprised 100 parts of dimethyl silicone gum similar to that employed in Example 1 and 200 parts $TiO_2$. In one case 0.2 part of the decaboranehexamethylenetetramine addition product was added and in the other case 0.1 part of the addition product of decaborane and p,p'-diaminodiphenylmethane was added to the formulation. Each mixture was prepared by milling on regular rubber compounding rolls and then was heated for 10 minutes in a mold at 150° C. under about 500 p. s. i. and thereafter additionally heated in a 200° C. oven for varying lengths of time. The following table shows the tensile strengths and percents elongation developed as a result of this 200° C. heating.

TABLE III

| Cure Accelerator | Time of Heating at 200° C. | | | |
|---|---|---|---|---|
|  | 12 Hours | 24 Hours | 48 Hours | 60 Hours |
| $B_{10}H_{14}$ plus hexamethylenetetramine addition product | 284 p. s. i., 100% Elongation. | 238 p. s. i., 173% Elongation. | 290 p. s. i., 177% Elongation. | 280 p. s. i., 185% Elongation. |
| $B_{10}H_{14}$ plus p,p'-diaminodiphenylmethane addition product. | 156 p. s. i., 100% Elongation. | 230 p. s. i., 140% Elongation. | 244 p. s. i., 160% Elongation. | 218 p. s. i., 170% Elongation. | the gum without the $B_{10}H_{14}$ and the gum containing small amounts of benzoyl peroxide both lost large amounts of volatile material, even after short periods of time at 300° C., and began to disintegrate rapidly at this temperature. Finally, the samples containing the $B_{10}H_{14}$ all had essentially the same tensile strength after the heat test as when the heating was originally begun at 300° C., they were homogeneous and had changed little in appearance.

This marked stabilizing effect of the boron hydrides in the silicone gums is very useful in applications where the cured, solid, elastic organopolysiloxanes are to be employed in applications where elevated temperatures may be encountered over long periods of time. By means of the boron hydrides, it is possible to keep to a minimum the loss of volatile materials, which in escaping may cause various difficulties either because of the change in the physical characteristics of the remaining solid, elastic organopolysiloxanes, or in the effect of the volatile materials on surrounding apparatus or objects.

*Example 3*

In this example an addition compound of hexamethylenetetramine and decaborane ($B_{10}H_{14}$) was prepared by dissolving 0.3 gram hexamethylenetetramine in an excess of benzene and then adding 0.3 gram decaborane to this solution. A white precipitate formed slowly on stirring which

*Example 4*

In this example, an ammonia complex of a boron hydride, specifically $B_2H_6.2NH_3$, was added to a sample of methyl silicone gum similar to that employed in Example 1 in an amount equal to about 0.5% by weight based on the weight of the gum. The methyl silicone gum had incorporated therein by weight about two parts titanium dioxide per part of gum. After compounding the mixture on regular rubber compounding rolls, it was pressed in the same manner as was done in the previous examples to obtain a vulcanized product of increased tensile strength and elongation.

*Example 5*

About 0.5% by weight $B_5H_9$ (containing a small amount of iron carbonyl to prevent spontaneous flammability) dissolved in a small amount of toluene was used as a vulcanization accelerator for a silicone rubber compound similar to that employed in Example 1. After pressing at 150° C. for about 20 minutes under a pressure of 500 p. s. i. the product was well vulcanized and had good tensile strength and elongation. The sample was further heat treated for 16 days at 200° C. It was noted that little, if any, change in properties occurred as a result of this latter heat treatment. The cured silicone rubber was flexible and had satisfactory tensile strength and elongation.

It will of course be apparent to those skilled in the art that other boron hydrides, many examples of which have been given before, may be used in place of the boron hydrides described in the foregoing examples. In addition, the boron hydrides may be employed with other organopolysiloxanes as, for example, other heat-curable liquid or solid elastic organopolysiloxanes. Additional examples of such materials have been given in the foregoing patents. It is preferred that the organopolysiloxanes employed in the practice of the present invention contain at least 60 mol percent of diorganosiloxanes corresponding to the formula RR'SiO where R and R' are alkyl radicals, for example, methyl, ethyl, propyl, isopropyl, butyl, etc.; R' may also be an aryl radical. The alkyl radicals preferably contain less than 8 carbon atoms per radical. In many cases, dimethylsiloxanes containing small amounts of copolymerized monocyclic aryl siloxanes, for example, copolymerized diphenyl siloxane or copolymerized methyl phenyl disiloxane may also be employed to impart improved low temperature flexibility to the silicone rubber.

The cured, solid, elastic organopolysiloxanes (that is, the synthetic silicone elastomers) prepared and vulcanized in accordance with our invention are capable of withstanding elevated temperatures (150° C. to 250° C.) for extended periods of time, and also retain their desirable rubbery properties at temperatures as low as −50° to −60° C. Such a range of properties makes them highly useful as insulation materials for electrical conductors, gasket material, shock absorbers, and for other applications where other natural or synthetic rubbers have heretofore been employed, where it is desired to take advantage of the high temperature resistance and low temperature flexibility of the claimed solid, elastic organopolysiloxanes.

What we claim as new and desire to secure by Letters Patent of the United States is:

1. A heat-convertible composition of matter comprising (1) a heat-curable polymerized hydrocarbon-substituted polysiloxane containing an average of from 1.75 to 2.25 hydrocarbon groups per silicon atom and (2) a small amount of a boron hydride.

2. A heat-convertible composition of matter comprising (1) a heat-curable polymerized hydrocarbon-substituted polysiloxane containing an average of from 1.75 to 2.25 hydrocarbon groups per silicon atom and (2) a small amount of a cure accelerator for (1) comprising a boron hydride selected from the class consisting of decaborane, pentaborane, $B_6H_{10}$, the ammonia complex of diborane corresponding to the formula $B_2H_6 \cdot 2NH_3$, diphenyl decaborane, addition products of boron hydrides and hexamethylenetetramine, addition products of boron hydrides and p,p'-diaminodiphenylmethane.

3. A heat-convertible composition of matter comprising (1) a heat-curable polymerized methylpolysiloxane containing an average of from 1.75 to 2.25 methyl groups per silicon atom and (2) a small amount of a boron hydride.

4. A heat-convertible composition of matter comprising (1) a heat-curable polymerized methylpolysiloxane containing an average of from 1.98 to 2.0, inclusive, methyl groups per silicon atom and (2) a small amount of a boron hydride.

5. A heat-convertible composition of matter comprising (1) a heat-curable polymerized methylpolysiloxane containing an average of from 1.98 to 2.0, inclusive, methyl groups per silicon atom and (2) a small amount of a vulcanization accelerator for (1) comprising $B_{10}H_{14}$.

6. A heat-convertible composition of matter comprising (1) a heat-curable polymerized methylpolysiloxane containing an average of from 1.98 to 2.0, inclusive, methyl groups per silicon atom and (2) a small amount of $B_6H_{10}$.

7. A heat-convertible composition of matter comprising (1) a heat-curable polymerized methylpolysiloxane containing an average of from 1.98 to 2.0, inclusive, methyl groups per silicon atom and (2) a small amount of $B_5H_9$.

8. A heat-convertible composition of matter comprising (1) a heat-curable polymerized methylpolysiloxane containing an average of from 1.98 to 2.0, inclusive, methyl groups per silicon atom and (2) a small amount of an ammonia complex of a boron hydride corresponding to the formula $B_2H_6 \cdot 2NH_3$.

9. A heat-convertible composition of matter comprising (1) a heat-curable polymerized methylpolysiloxane containing an average of from 1.98 to 2.0, inclusive, methyl groups per silicon atom and (2) a small amount of a vulcanization accelerator for (1) comprising diphenyl decaborane.

10. A heat-convertible composition of matter comprising (1) a heat-curable polymerized organopolysiloxane containing an average of from 1.75 to 2.25 organic groups per silicon atom, (2) a filler, and (3) a small amount of a boron hydride.

11. A heat-convertible composition of matter comprising (1) a heat-curable polymerized methylpolysiloxane containing an average of from 1.98 to 2.0, inclusive, methyl groups per silicon atom, (2) a filler, and (3) a small amount of $B_{10}H_{14}$ as a vulcanization accelerator for (1).

12. The heat treated product of claim 1.
13. The heat-treated product of claim 2.
14. The heat-treated product of claim 5.
15. The heat-treated product of claim 6.
16. The heat-treated product of claim 7.
17. The heat-treated product of claim 8.
18. The heat-treated product of claim 9.
19. The heat-treated product of claim 11.

20. The method of vulcanizing a heat-convertible composition matter comprising a heat-curable polymerized hydrocarbon-substituted polysiloxane containing an average of from 1.75 to 2.25 hydrocarbon groups per silicon atom, which method comprises incorporating in the said organopolysiloxane a small amount of a boron hydride, and thereafter heating the mixture at an elevated temperature for a time sufficient to effect curing of the organopolysiloxane to the substantially infusible and insoluble state.

21. The method for vulcanizing a heat-convertible composition of matter comprising a heat-curable polymerized methylpolysiloxane containing an average of from 1.98 to 2.0, inclusive, methyl groups per silicon atom, which method comprises incorporating in the said methylpolysiloxane a small amount of a boron hydride and thereafter heating the mixture at temperature of the order of about from 100° to 300° C. for a time sufficient to effect conversion of the organopolysiloxane to the substantially infusible and insoluble state.

22. The method for vulcanizing a heat-convertible composition of matter comprising a heat-curable polymerized organopolysiloxane containing an average of from 1.98 to 2.0, inclusive, methyl groups per silicon atom, which method comprises incorporating in the aforesaid methylpolysiloxane a small amount of $B_{10}H_{14}$, and thereafter heating the mixture at an elevated temperature for a time sufficient to effect conversion of the methylpolysiloxane to the substantially insoluble and infusible state.

23. The method for vulcanizing a heat-convertible composition of matter comprising a heat-curable polymerized methylpolysiloxane containing an average of from 1.98 to 2.0, inclusive, methyl groups per silicon atom, which method comprises incorporating in the methylpolysiloxane a filler and a small amount of a vulcanization accelerator for the organopolysiloxane comprising $B_{10}H_{14}$, and thereafter heating the mixture at an elevated temperature for a time sufficient to effect conversion of the said methylpolysiloxane to the substantially infusible and insoluble state.

MOYER M. SAFFORD
DALLAS T. HURD.

No references cited.